US009962632B2

(12) United States Patent
Carrejo et al.

(10) Patent No.: US 9,962,632 B2
(45) Date of Patent: May 8, 2018

(54) INFLOW CONTROL DEVICE

(71) Applicants: Nicholas Carrejo, Katy, TX (US); Michael H. Johnson, Katy, TX (US); Bradley R. Kellogg, Houston, TX (US)

(72) Inventors: Nicholas Carrejo, Katy, TX (US); Michael H. Johnson, Katy, TX (US); Bradley R. Kellogg, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 86 days.

(21) Appl. No.: 14/698,275

(22) Filed: Apr. 28, 2015

(65) Prior Publication Data

US 2016/0317957 A1 Nov. 3, 2016

(51) Int. Cl.
*B01D 29/01* (2006.01)
*B01D 35/02* (2006.01)
*B01D 35/153* (2006.01)

(52) U.S. Cl.
CPC ............ *B01D 29/01* (2013.01); *B01D 35/02* (2013.01)

(58) Field of Classification Search
CPC .................... B01D 35/153
USPC .................... 210/136
See application file for complete search history.

(56) References Cited

U.S. PATENT DOCUMENTS 4,172,465 A * 10/1979 Dashner ................ F16K 15/063 137/533.27
4,614,581 A * 9/1986 Drori .................. B01D 35/157 210/108
5,271,430 A * 12/1993 Muruyama ............... F16K 3/24 137/484.4
7,225,830 B1 * 6/2007 Kershaw ................ F16K 17/06 137/512.1
7,255,830 B2 6/2007 Kershaw
2007/0034377 A1 * 2/2007 Moyes .................. E21B 34/063 166/305.1
2008/0099194 A1 * 5/2008 Clem ................... E21B 43/267 166/51
2011/0290326 A1 12/2011 Ovland
2013/0180725 A1 * 7/2013 Richard ................ E21B 43/12 166/317

OTHER PUBLICATIONS

Notification of Transmittal of the International Search Report and the Written Opinion of the International Searching Authority, or the Declaration; PCT/US22016-024679; dated Jun. 24, 2016: 12 pages.

* cited by examiner

*Primary Examiner* — Robert Clemente
*Assistant Examiner* — Akash Varma
(74) *Attorney, Agent, or Firm* — Cantor Colburn LLP

(57) ABSTRACT

A inflow control device includes a housing. A filter media disposed in the housing. A closure member; and a spring disposed between the closure member and the filter media. A method for controlling fluid loss for a period of time.

13 Claims, 3 Drawing Sheets

26
13
15
10
24
O
20
14
16
I
22
18
12

INFLOW CONTROL DEVICE

BACKGROUND

In the drilling and completion industry, it is often desirable to both reduce fluid loss during a part of an operation and allow fluid movement for production during another part of an operation through the same port structure. Strong and robust configurations are important and growing more so as downhole operations are carried out in increasingly difficult environments. Therefore the art will well receive new configurations for such devices that may perform better in certain applications than existing technologies.

BRIEF DESCRIPTION

An inflow control device includes a housing; a filter media disposed in the housing; a closure member; and a spring disposed between the closure member and the filter media.

A method for controlling fluid loss for a period of time includes plugging an inflow control device including an inflow control device including a housing; a filter media disposed in the housing; a closure member; and a spring disposed between the closure member and the filter media with a barrier; exposing the barrier to a fluid that dissolves or disintegrates the barrier; and dissolving or disintegrating the barrier.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
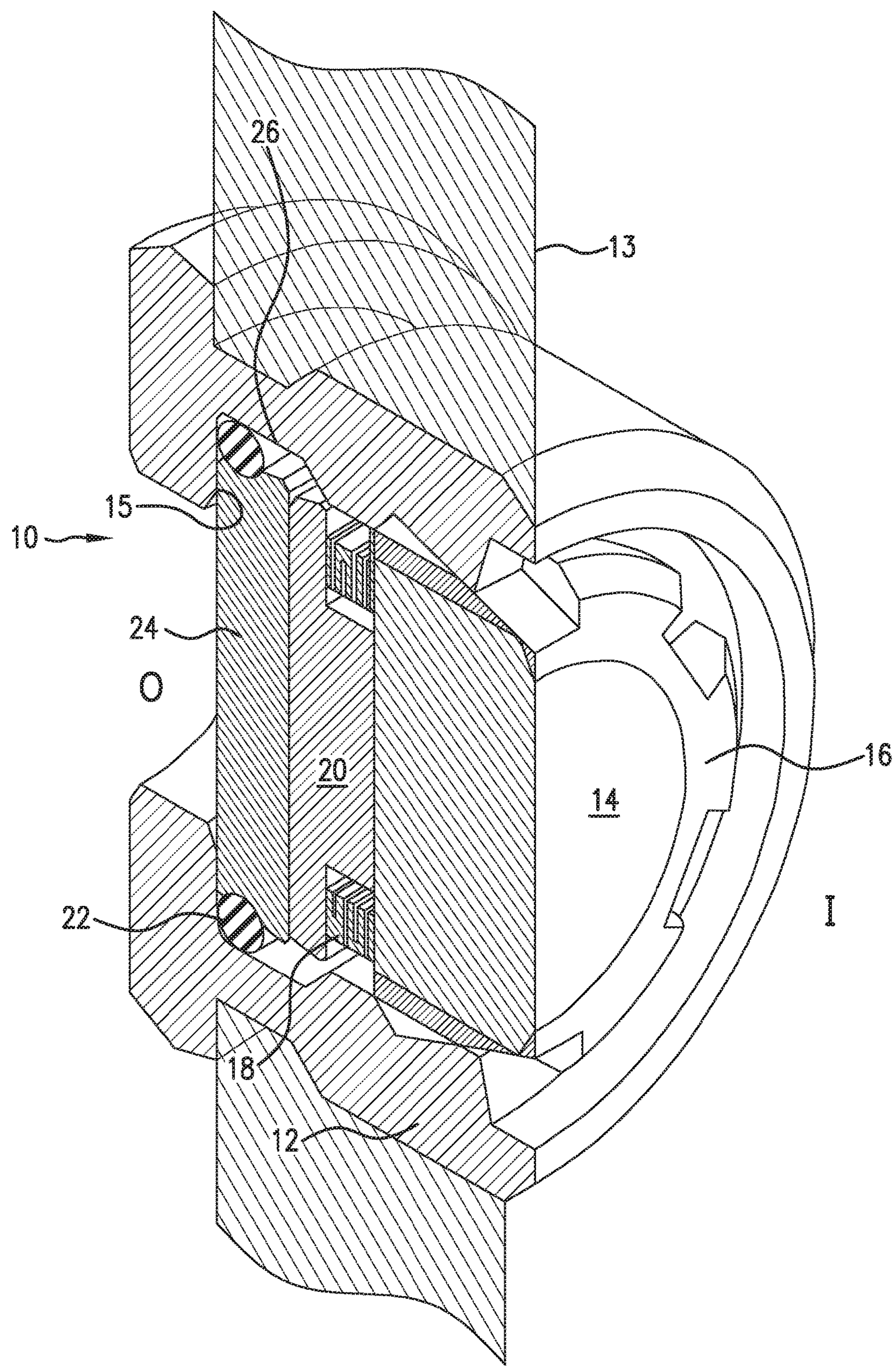
FIG. 1 is a perspective cross section view of an inflow control device.
Figure 2:
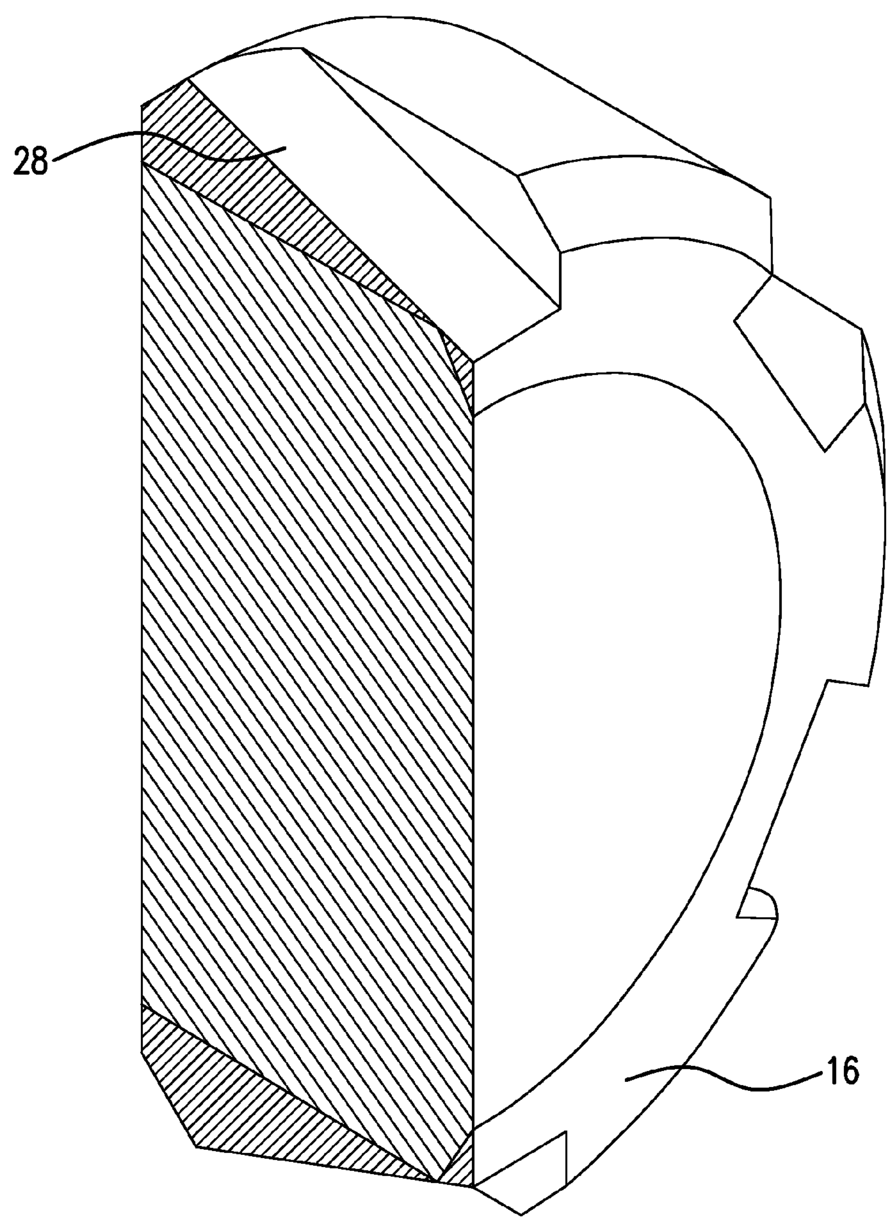
FIG. 2 is a perspective cross section view of a filter media portion of the inflow control device of FIG. 1.

Referring to FIG. 1, an embodiment of the inflow control device 10 as disclosed herein, which may in some embodiments be a sand control device, is illustrated in perspective cross section. The device includes a housing 12 within which is a filtration media 14. The housing 12 is in general known in the art as a plug due to commercialization of the housing for other operation. Some modifications of the interior structure of the plug are illustrated. The right side of the figure "I" is to be understood to be toward an inside of a tubular in which the housing is installed and the left side of the figure "O" is to be understood to be at an outside surface of a tubular in which the housing is installed. The tubular is shown as numeral 13; the overall housing configuration by itself has been used commercially and is known to those of skill in the art. The media 14 may be any type of filtration media that will adequately filter fines expected in the environment in which the device 10 is intended for use. In one iteration the filtration media is a bead pack and in others it is a foam. The illustration is intended to convey any type of filtration material. The filtration media 14 may be mounted in the housing 12 in any number of known ways including having its own filtration media holder 16 that is configured to engage the housing 12 and maintain its position therein. In such situation, the holder 16 may include profiles 28 (see FIG. 2) to help install the filtration media 14 in the housing 12. The filtration media 14 is toward an inside of the tubular as illustrated in the housing in FIG. 1. The filtration media 14 may also be formed in the housing or bonded therein by suitable adherent such as an adhesive or braze, or may be threadedly disposed in the housing, etc.

Figure 3:
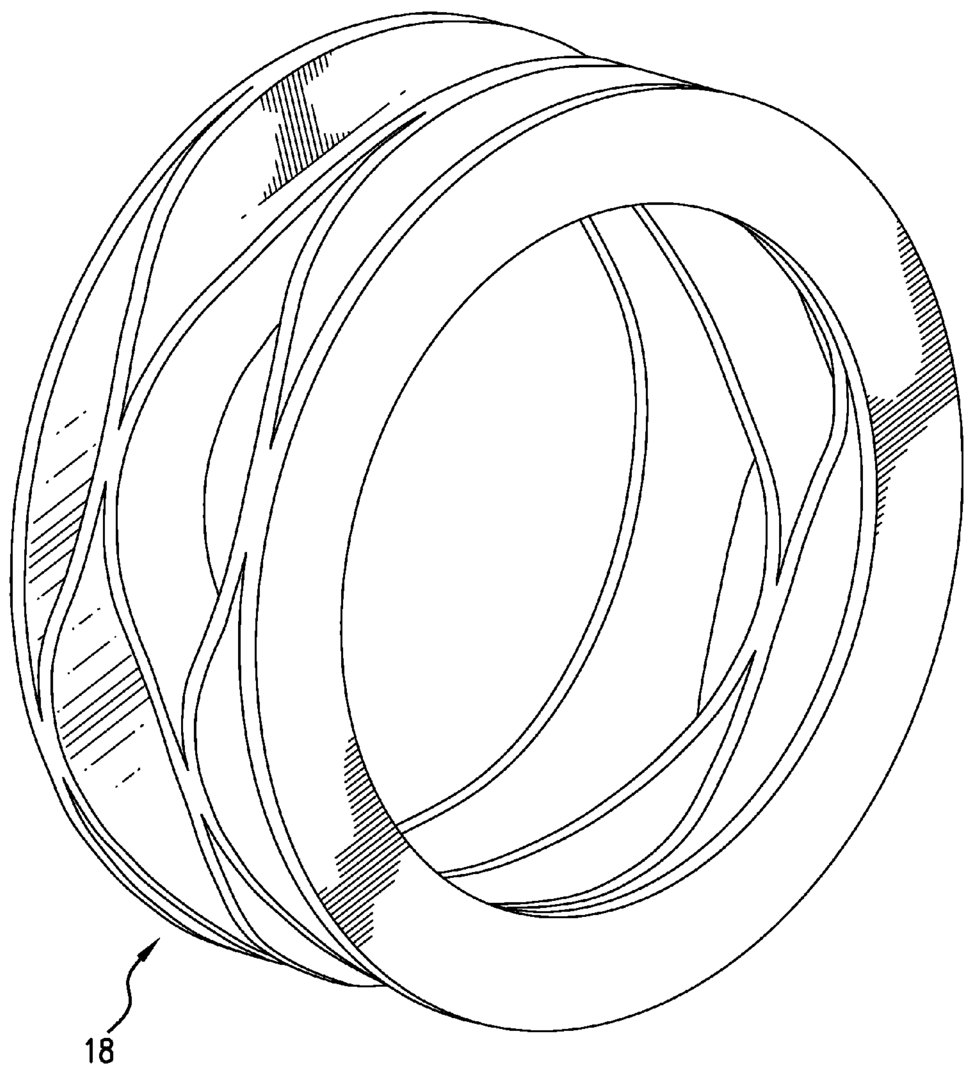
FIG. 3 is a perspective view of a spring element of the device of FIG. 1.

Immediately outwardly of the filtration media 14 is a compression spring 18. The spring is visible in FIG. 1 but better seen in FIG. 3, which is dedicated to one embodiment of the spring 18. The spring 18 functions to urge a closure member 20 toward the end O of the housing 12 and against seat 15 to prevent fluid flow from end I to end O while allowing fluid to flow in the opposite direction providing there is a pressure head sufficient to unseat the closure member 20 through pressure based compression of the spring 18. The spring may be constructed of any material that has sufficient resilience to function as stated. Two non-limiting examples are polymer springs and metallic springs. Flow around the closure member when not seated is assisted by a recess 26 in the housing. Closure is assisted by a seal 22 such as an O-ring. In some embodiments, there need be no other components where the spring is hearty enough to prevent fluid loss by itself.

In other embodiments and as illustrated in FIG. 1, an additional barrier 24 is employed. This barrier is intended to be removable. In one embodiment, the barrier 24 is a dissolvable, degradable or disintegrable material such as a bio polymer or a controlled electrolytic metallic material (commercially available from Baker Hughes Incorporated Houston Tex. under the trade name Intallic™). In embodiments that use the barrier, it ensures a leak tight seal against fluid loss until the barrier 24 is removed. Where removal is by dissolution, degradation or disintegration, it may be by exposure to normally downhole fluids or other fluids specially introduced to the downhole environment for the purpose of removing the barrier, such as acid. After removal of the barrier, the device will operate as discussed for the embodiments that do not include a barrier.

Further contemplated is a method for controlling fluid loss and inflow control the method comprising holding fluid against loss to a formation for a period of time, removing a barrier and producing a target fluid through a device as disclosed above.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An inflow control device configured for insertion in a wall of a tubular comprising:

a housing having a seat configured for installation in the wall of the tubular;

a filter media disposed in the housing;

a closure member radially outwardly disposed of the filter media in the housing;

a barrier disposed between the closure member and the seat, the barrier preventing fluid flow through the housing until the barrier is at least partially removed from the inflow control device; and a spring disposed between the closure member and the filter media.

2. The inflow control device as claimed in claim 1 wherein the housing includes a recess that promotes flow around the closure member when the closure member is not seated.

3. The inflow control device as claimed in claim 1 wherein the barrier is dissolvable, degradable or disintegrable.

4. The inflow control device as claimed in claim 3 wherein the barrier is a controlled electrolytic metallic material.

5. The inflow control device as claimed in claim 3 wherein the barrier is a biopolymer.

6. The inflow control device as claimed in claim 1 wherein the filter media is a bead pack.

7. The inflow control device as claimed in claim 1 wherein the filter media is a foam.

8. The inflow control device as claimed in claim 1 wherein the closure member seals against an O-ring.

9. The inflow control device as claimed in claim 1 wherein the spring is a compression spring.

10. The inflow control device as claimed in claim 1 wherein the spring is a polymer.

11. The inflow control device as claimed in claim 1 wherein the spring is metallic.

12. A method for controlling fluid loss for a period of time comprising:

plugging an inflow control device as claimed in claim 1;

exposing the barrier to a fluid that dissolves or disintegrates the barrier; and dissolving or disintegrating the barrier.

13. The method as claimed in claim 11 further comprising producing fluid through the device upon a pressure differential across the closure member exceeding a spring force of the spring.

* * * * *